United States Patent
Yokoyama et al.

(10) Patent No.: US 10,218,863 B2
(45) Date of Patent: Feb. 26, 2019

(54) INFORMATION PROCESSING APPARATUS HAVING HUMAN PRESENCE SENSOR

(71) Applicant: CANON KABUSHIKI KAISHA, Tokyo (JP)

(72) Inventors: Junnosuke Yokoyama, Toride (JP); Manabu Hada, Kawasaki (JP); Yusuke Horishita, Nagareyama (JP); Michio Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/647,145

(22) Filed: Jul. 11, 2017

(65) Prior Publication Data

US 2018/0034988 A1 Feb. 1, 2018

(30) Foreign Application Priority Data

Jul. 29, 2016 (JP) ................. 2016-150106

(51) Int. Cl.
*H04N 1/00* (2006.01)

(52) U.S. Cl.
CPC ..... *H04N 1/00551* (2013.01); *H04N 1/00352* (2013.01); *H04N 1/00896* (2013.01); *H04N 2201/0094* (2013.01)

(58) Field of Classification Search
USPC ...................................... 358/1.15
See application file for complete search history.

(56) References Cited

U.S. PATENT DOCUMENTS

2006/0266949 A1* 11/2006 Bender ............. G08B 13/1618
  250/370.1
2015/0261168 A1*  9/2015 Yokoyama ............. G03G 15/80
  399/81

FOREIGN PATENT DOCUMENTS

JP    2013-195308 A    9/2013

OTHER PUBLICATIONS

Murata Manufacturing Co. Ltd., Application Manual of Murata Ultrasonic Sensor, Aug. 2009, Murata Manufacturing Co. Ltd., Cat. No. S15E-5.*

* cited by examiner

*Primary Examiner* — Ngon B Nguyen
(74) *Attorney, Agent, or Firm* — Canon U.S.A., Inc. IP Division

(57) ABSTRACT

An information processing apparatus includes a sonic wave output unit that outputs a sonic wave. A horn restricts an output direction of the sonic wave output from the sonic wave output unit. A cover member is provided on the sonic wave output unit, wherein a region on the cover member corresponding to an opening of the horn is provided with a horizontally arranged slit having a width equal to or larger than a horizontal width of the opening.

8 Claims, 18 Drawing Sheets

FIG.7
BEFORE HORN IS ATTACHED
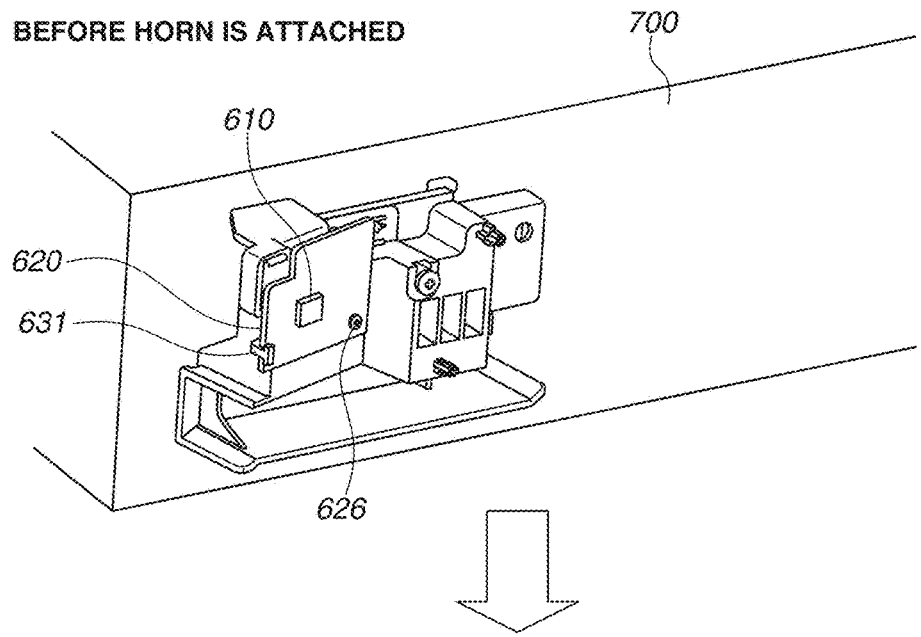
AFTER HORN IS ATTACHED
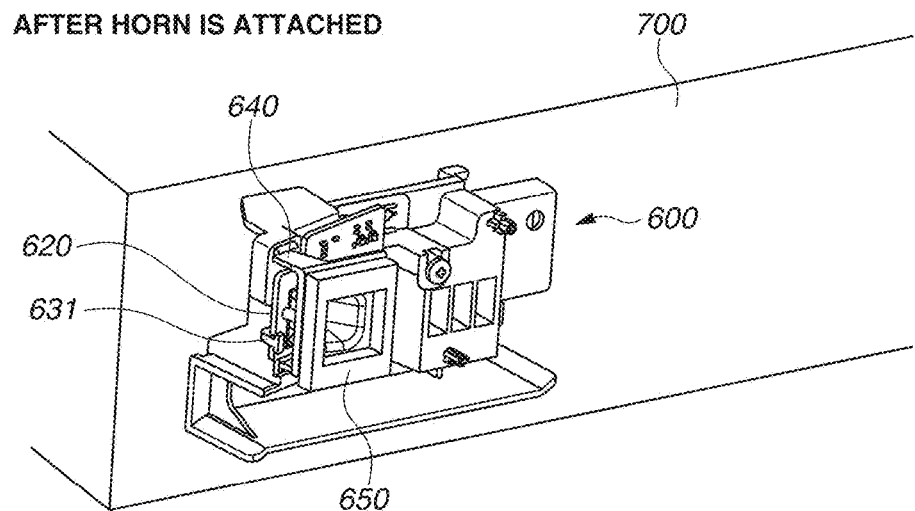

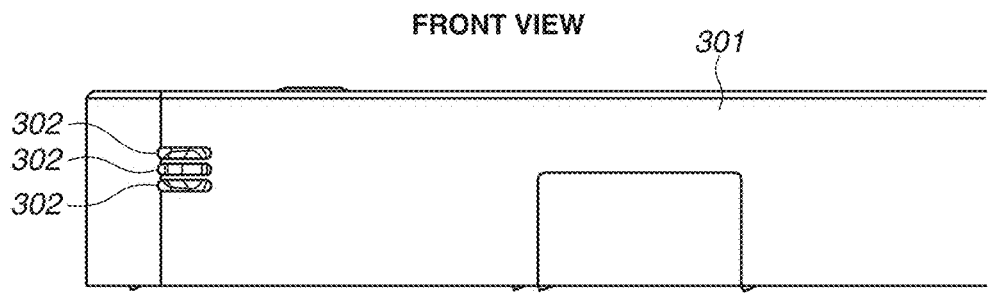
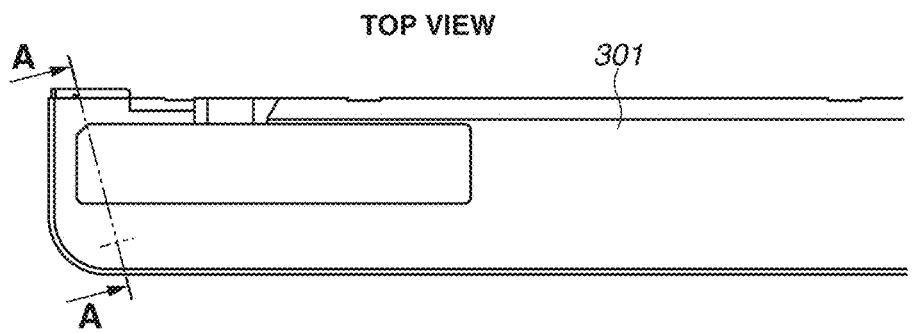
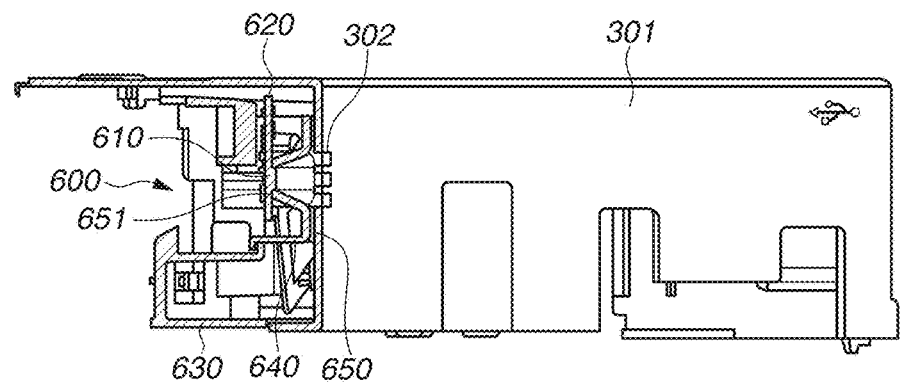

FRONT VIEW

SECTIONAL VIEW TAKEN ALONG B-B LINE

REAR VIEW

SECTIONAL VIEW TAKEN ALONG C-C LINE

BEFORE HORN AND COVER ARE ATTACHED

AFTER HORN AND COVER ARE ATTACHED

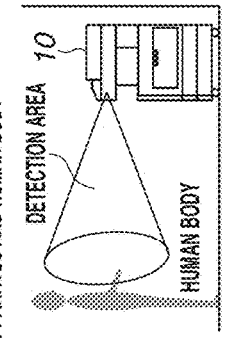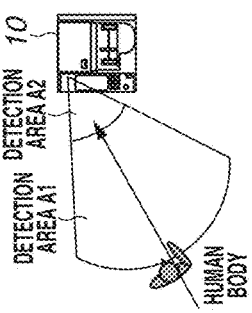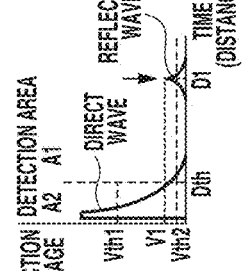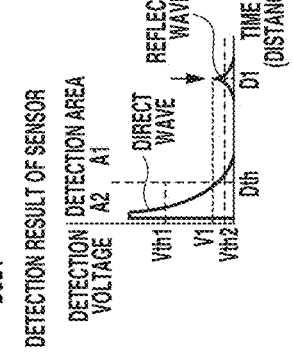

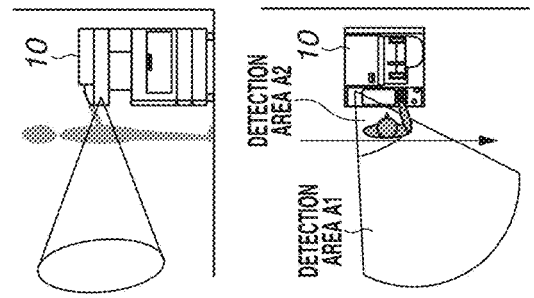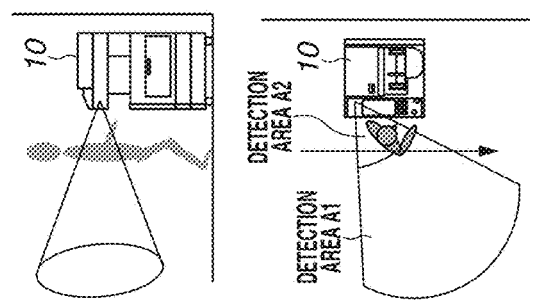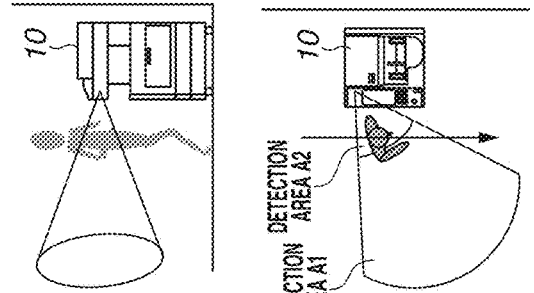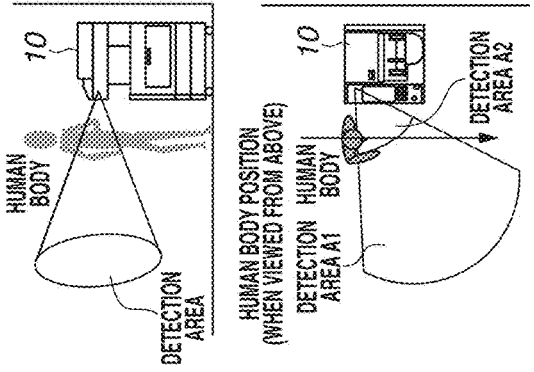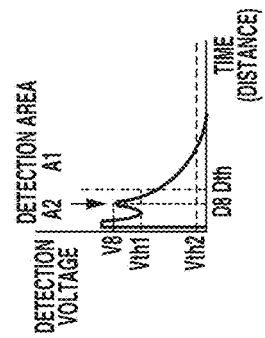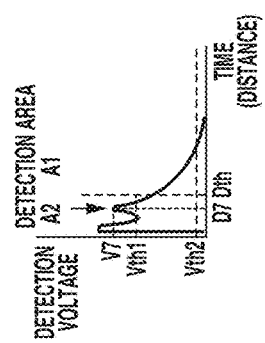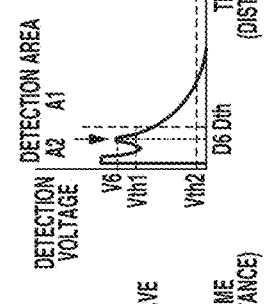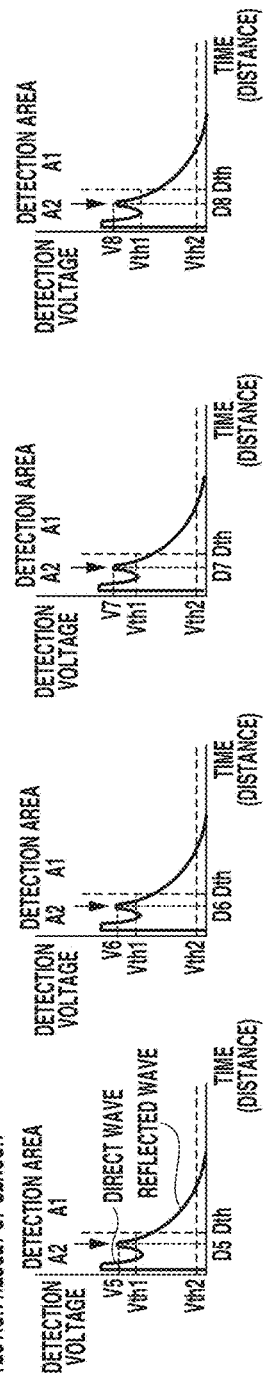

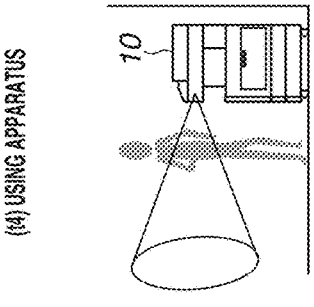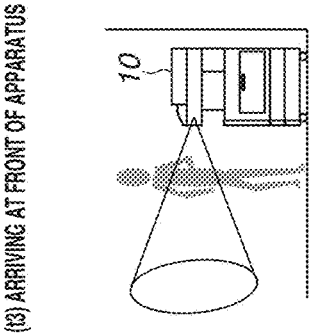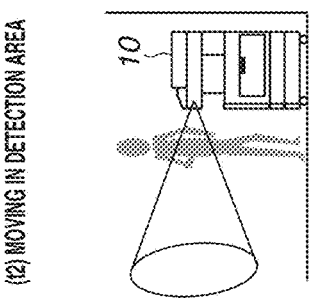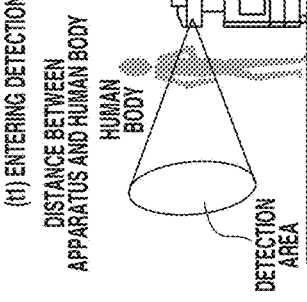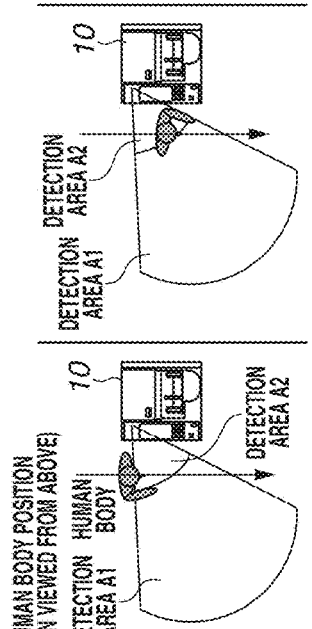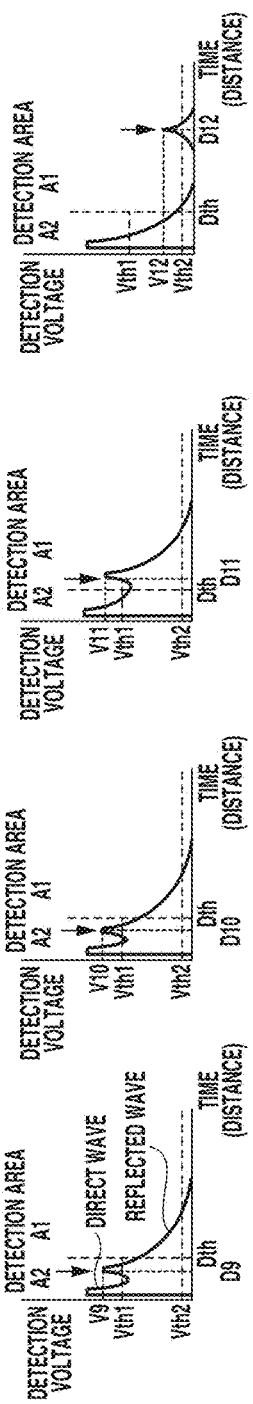

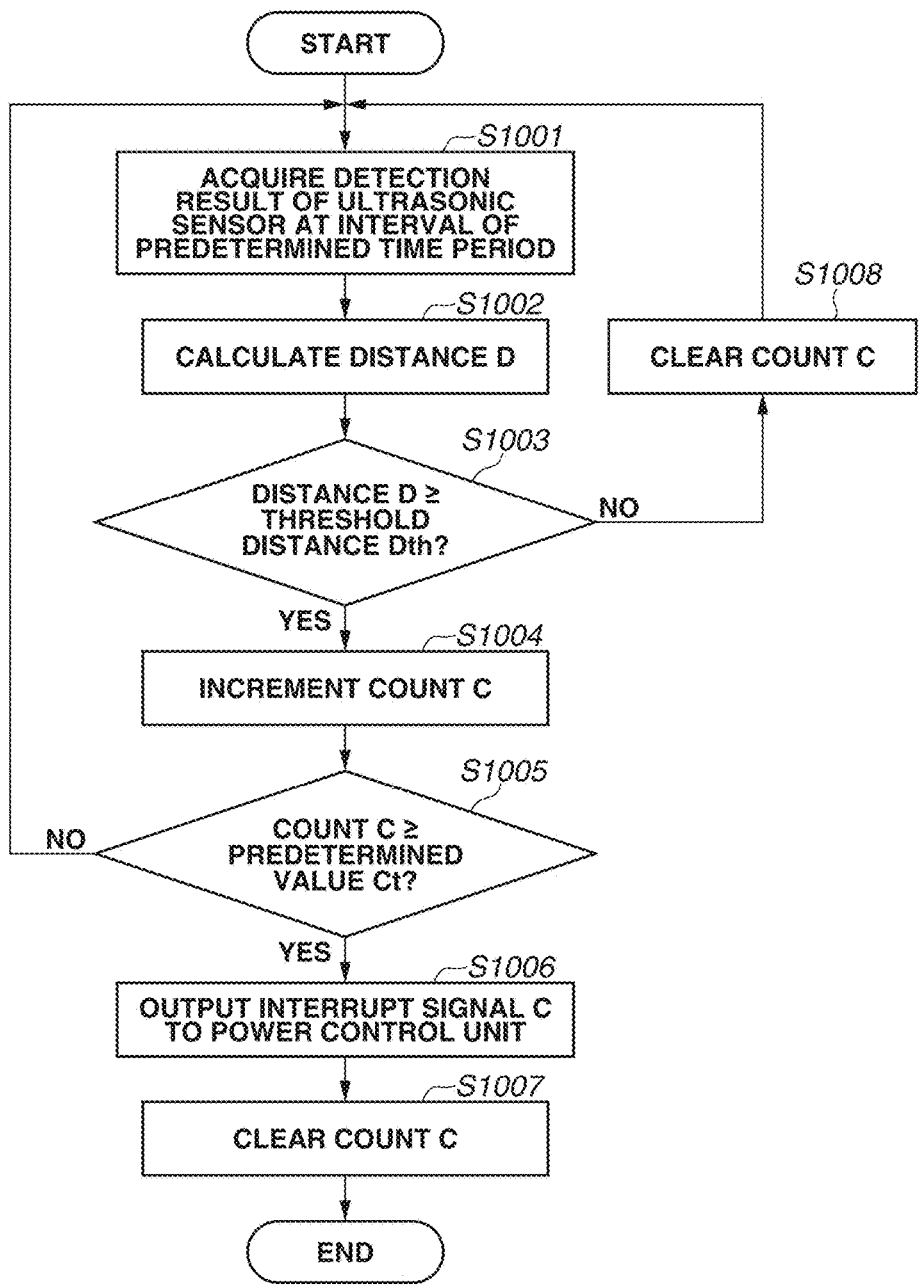

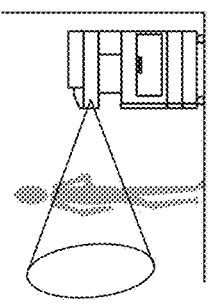
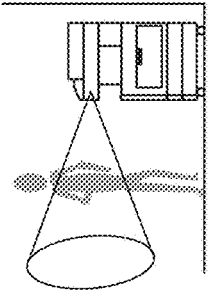
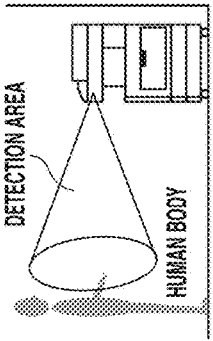
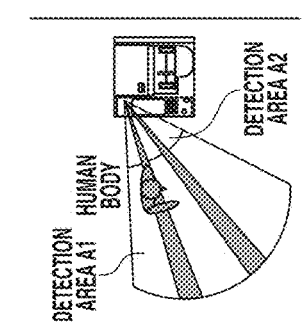
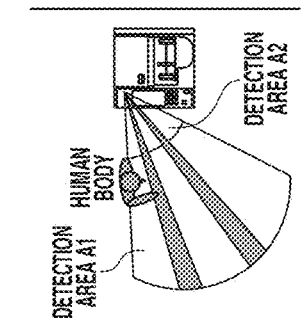
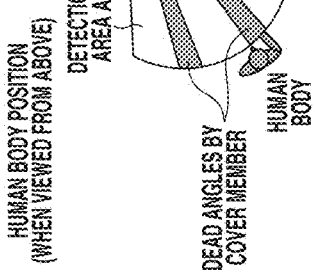
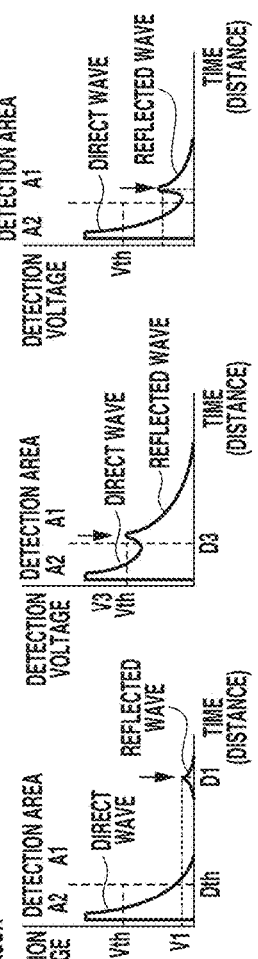
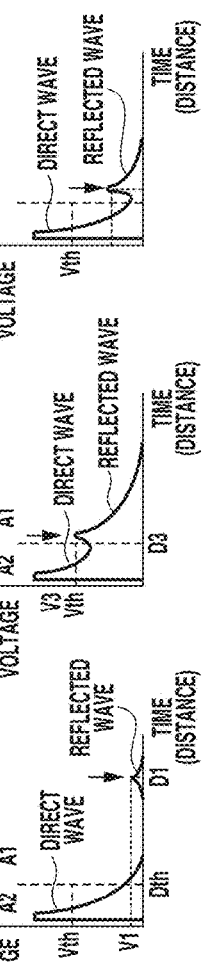

INFORMATION PROCESSING APPARATUS HAVING HUMAN PRESENCE SENSOR

BACKGROUND OF THE INVENTION

Field of the Invention

The disclosure relates to the shape of a cover of a sensor for detecting a person included in an information processing apparatus.

Description of the Related Art

A recent information processing apparatus is provided with a sensor (hereinafter referred to as a human presence sensor) for detecting a user of the information processing apparatus. When the user of the information processing apparatus is detected by the human presence sensor, the information processing apparatus in the sleep mode cancels the sleep mode and recovers to the standby mode.

An image forming apparatus discussed in Japanese Patent Application Laid-Open No. 2013-195308 is provided with a sensor for receiving infrared rays and a cover member having a monitoring window for limiting the detection range of the sensor.

In the image forming apparatus discussed in Japanese Patent Application Laid-Open No. 2013-195308, the monitoring window is formed at the position on the cover member corresponding to the sensor, and thus an object such as a finger intruding into the monitoring window may cause a sensor failure. If the opening area of the monitoring window is excessively restricted to prevent intrusion of a finger, the detection range of the sensor decreases, making it impossible to suitably detect a user of the image forming apparatus.

SUMMARY OF THE INVENTION

The disclosure is directed to an information processing apparatus having a cover member of a sensor devised not only to prevent intrusion of a finger with respect to a sensor but also to prevent a decrease in the detection range of the sensor.

According to an aspect of the disclosure, an information processing apparatus includes a sonic wave output unit configured to output a sonic wave, a horn configured to restrict an output direction of the sonic wave output from the sonic wave output unit, and a cover member of the sonic wave output unit, wherein a region on the cover member corresponding to an opening of the horn is provided with a horizontally arranged slit having a width equal to or larger than a horizontal width of the opening.

Further features and aspects of the disclosure will become apparent from the following description of numerous example embodiments with reference to the attached drawings.

BRIEF DESCRIPTION OF THE DRAWINGS

FIG. 7 illustrates the human presence sensor unit before and after a horn is attached thereto.

FIG. 8A is a front view illustrating the human presence sensor unit. FIG. 8B is a top view illustrating the human presence sensor unit. FIG. 8C is a sectional view illustrating the human presence sensor unit.

FIGS. 13T1, 13T2, 13T3, and 13T4 illustrate a case where a user straightly approaches a front of the MFP.

FIGS. 14T1, 14T2, 14T3, and 14T4 illustrate a case where a user approaches the MFP from a side of the MFP.

FIGS. 15T1, 15T2, 15T3, and 15T4 illustrate a case where a passer-by passes through the front of the MFP.

FIG. 16 is a flowchart illustrating a recovery algorithm based on a detection result of the ultrasonic sensor.

FIGS. 18A, 18B, and 18C illustrate dead angles of the ultrasonic sensor using the cover member according to the comparative example.

DESCRIPTION OF THE EXAMPLE EMBODIMENTS

Example embodiments and various aspects and features of the disclosure will be described below with reference to the accompanying drawings. The following describes a multi-function peripheral (MFP) having a plurality of functions such as scanning, printing, and copying according to the example embodiments of the disclosure.

Figure 1:
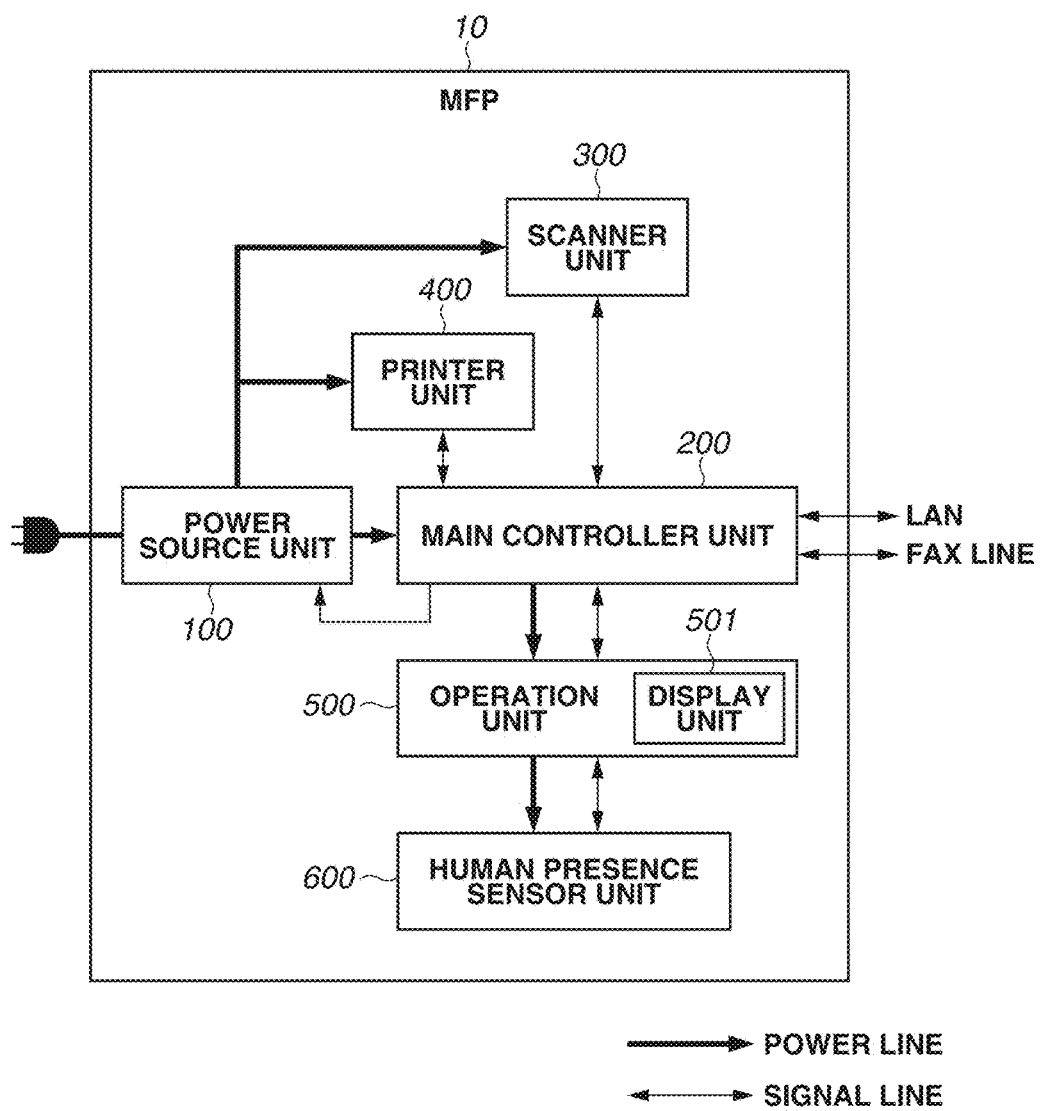
FIG. 1 is a block diagram illustrating an example configuration of a multi-function peripheral (MFP).

FIG. 1 is a block diagram schematically illustrating a configuration of an MFP 10.

The MFP 10 includes a power source unit 100, a main controller unit 200, a scanner unit (reading unit) 300, a printer unit (printing unit) 400, an operation unit 500, and a human presence sensor unit 600. The MFP 10 has at least two different power modes, i.e., a standby mode and a sleep mode. The standby mode is a mode in which a plurality of functions such as scanning, printing, and copying can be performed. The sleep mode provides lower power consumption than the standby mode. The standby mode corresponds to the S0 state specified by the Advanced Configuration and Power Interface (ACPI) standard and the sleep mode corresponds to the S3 state specified by the ACPI standard, respectively.

The MFP 10 shifts from the standby mode to the sleep mode when a condition for shifting to the sleep mode is satisfied. More specifically, the MFP 10 shifts from the standby mode to the sleep mode when a predetermined time period has elapsed without the operation unit 500 being operated by the user in the standby mode. The condition for shifting to the sleep mode includes not only the passage of a predetermined time period but also a user operation on a power-saving button provided on the operation unit 500, the coming of a preset sleep shift time, and the passage of a predetermined time period without print processing and scan processing being performed.

In the sleep mode, power supply to the main controller unit 200, the scanner unit 300, the printer unit 400, and the operation unit 500 is restricted. In the sleep mode, the display unit 501 of the operation unit 500 is turned off. In the standby mode, the display unit 501 of the operation unit 500 is turned on. In the standby mode, the main controller unit 200, the scanner unit 300, the printer unit 400, and the operation unit 500 are supplied with power.

In the sleep mode, the human presence sensor unit 600 is supplied with power. In the sleep mode, the MPF10 shifts from the sleep mode to the standby mode based on the detection result of the human presence sensor unit 600.

Figure 2:
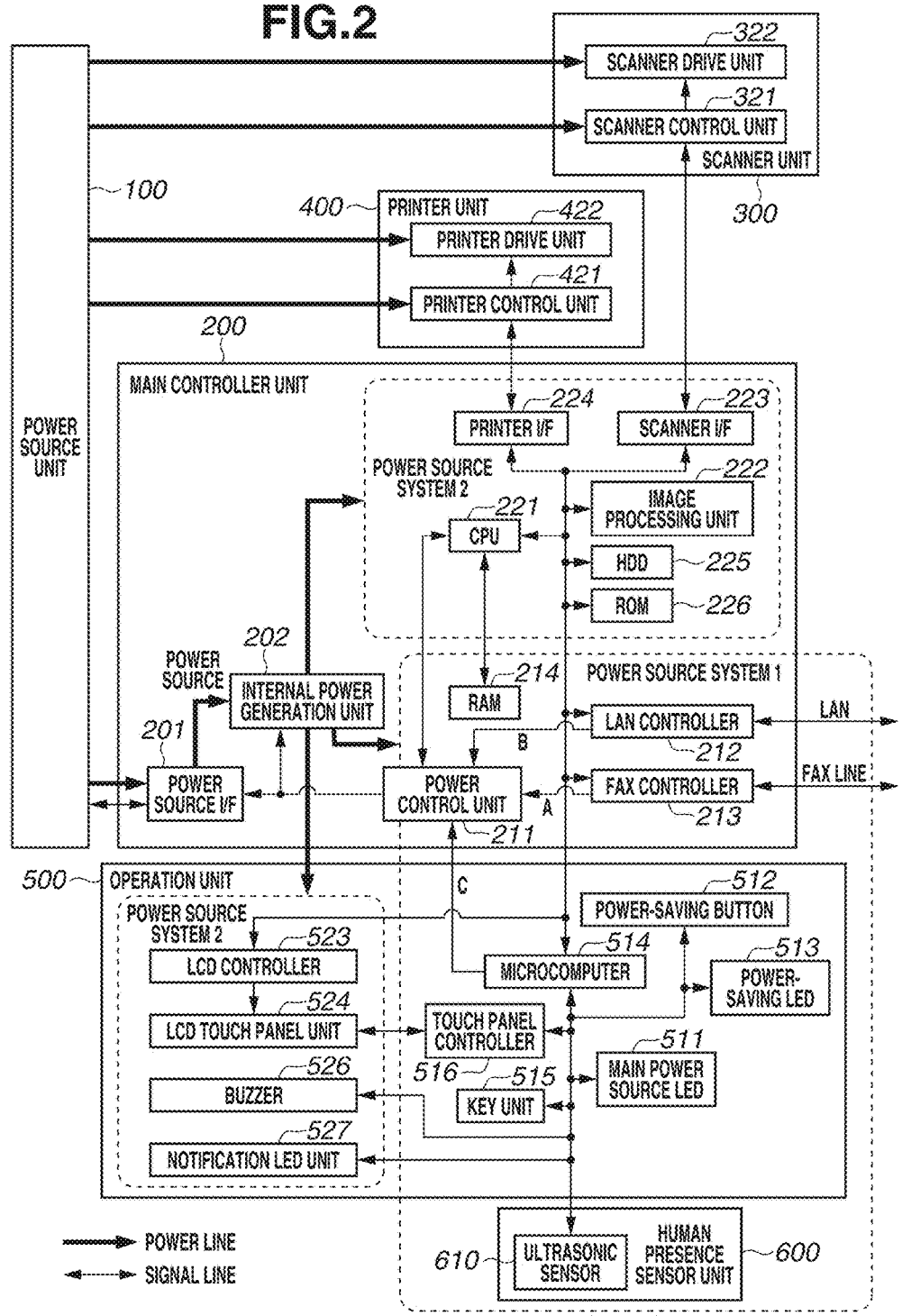
FIG. 2 is a block diagram illustrating details of the configuration of the MFP.

FIG. 2 is a block diagram illustrating details of the configuration of the MFP 10.

The scanner unit 300 optically reads an image of a document and generates image data. The scanner unit 300 includes a scanner control unit 321 and a scanner drive unit 322. The scanner drive unit 322 includes a drive unit for moving a reading head for reading an image of a document, and a drive unit for conveying a document to a reading position. The scanner control unit 321 controls operations of the scanner drive unit 322. When performing scan processing, the scanner control unit 321 receives user-set setting information via communication with the main controller unit 200, and controls operations of the scanner drive unit 322 based on the received setting information.

The printer unit 400 forms an image on a recording medium (paper) based on the electrophotographic method. The printer unit 400 includes a printer control unit 421 and a printer drive unit 422. The printer drive unit 422 includes a motor for rotating a photoconductive drum (not illustrated), and a pressuring mechanism and a heater for a fixing unit. The printer control unit 421 controls operations of the printer drive unit 422. When performing print processing, the printer control unit 421 receives user-set setting information via communication with the main controller unit 200, and controls operations of the printer drive unit 422 based on the received setting information.

The main controller unit 200 controls operations of the scanner unit 300 and the printer unit 400. For example, the main controller unit 200 instructs the scanner unit 300 to read an image of a document to generate image data according to a copy instruction input to the operation unit 500. Then, the main controller unit 200 performs image processing on the generated image data, and outputs the processed image data to the printer unit 400. Then, the main controller unit 200 instructs the printer unit 400 to print the image.

The main controller unit 200 has at least two different power source systems: a first power source system and a second power source system. Devices which need to operate even in the sleep mode belong to the first power source system. Devices which do not need to operate in the sleep mode belong to the second power source system. An internal power generation unit 202, supplied with power from the power source unit 100 via a power source interface (I/F) 201, supplies power to the devices belonging to the first power source system in the sleep mode. In the sleep mode, the devices belonging to the second power source system are not supplied with power.

In the sleep mode, it is sufficient to limit power supply to the devices belonging to the second power source system instead of stopping power supply. In the sleep mode, it is possible to perform clock gating and clock frequency reduction on the devices belonging to the second power source system. The devices belonging to the first power source system include a power control unit 211, a local area network (LAN) controller 212, a FAX controller 213, and a random access memory (RAM) 214. Even when the MFP 10 is in the sleep mode, the FAX controller 213 and the LAN controller 212 are supplied with power so that the MFP 10 can recover to the standby mode upon FAX reception or upon reception of a print request from a network in the sleep mode.

The internal power generation unit 202 supplies power to the devices belonging to the second power source system in the standby mode. The devices belonging to the second power source system include a central processing unit (CPU) 221, an image processing unit 222, a scanner I/F 223, a printer I/F 224, a hard disk drive (HDD) 225, and a read only memory (ROM) 226. In the sleep mode, power supply to the devices belonging to the second power source system is stopped.

The power control unit 211 is a device for controlling the power mode of the MFP 10. The power control unit 211 may be configured as a processor for executing software or as logic circuits. The above-described power control unit 211 inputs interrupt signals A, B, and C. When one of the interrupt signals A to C is input to the power control unit 211 in the sleep mode, the power control unit 211 controls the internal power generation unit 202 to supply power to the devices belonging to the second power source system. This causes the MFP 10 to recover from the sleep mode to the standby mode.

The interrupt signal A is a signal output by the FAX controller 213. The FAX controller 213 outputs the interrupt signal A upon FAX reception from a FAX line. The interrupt signal B is a signal output by the LAN controller 212. The LAN controller 212 outputs the interrupt signal B upon reception of a print job packet or status check packet from the LAN. The interrupt signal C is a signal output by a microcomputer 514 of the operation unit 500. The microcomputer 514 outputs the interrupt signal C when the microcomputer 514 determines that a user of the MFP 10 is present based on the detection result of the human presence sensor unit 600 or when a power-saving button 512 is pressed.

When one of the interrupt signals A to C is input, the CPU 221 is supplied with power and then recovers the MFP 10 to the state before it shifted to the sleep mode. More specifically, the CPU 221 reads information indicating the state of the MPF10 from the RAM 214 which has been performing a self-refreshment operation in the sleep mode. Then, the CPU 221 recovers the MFP 10 to the state before it shifted to the sleep mode by using the read information. Then, the CPU 221 executes processing according to the recovery factor out of the interrupt signals A to C.

The operation unit 500 includes a LCD touch panel unit 524 (display unit 501) integrating a LCD panel and a touch panel, a key unit 515 for detecting a key operation of the user, such as a numeric keypad operation and a start key operation, and a buzzer 526. An image corresponding to image data generated by the CPU 221 of the main controller unit 200 is drawn on the LCD touch panel unit 524. The LCD controller 523 receives image data from the CPU 221 and displays an image on the LCD touch panel unit 524 based on the image data. When the user touches the screen of the LCD touch panel unit 524, the touch panel controller 516 analyzes coordinate data of the touched position, and notifies the microcomputer 514 of the coordinate data. The microcomputer 514 notifies the CPU 221 of the coordinate data. The microcomputer 514 may notify the CPU 221 of information indicating a touched icon instead of the coordinate data. The microcomputer 514 periodically scans an operation on the key unit 515. When the microcomputer 514 determines that the user has performed an operation on the key unit 515, the microcomputer 514 notifies the CPU 221 of information about the operation performed on the key unit 515. When the CPU 221 is informed that the user has performed an operation on the LCD touch panel unit 524 or the key unit 515, the CPU 221 operates the MFP 10 in response to the user operation.

The operation unit 500 has a plurality of light emitting diodes (LEDs). A main power source LED 511 lights up when the main power source of the MFP 10 is on. A notification LED unit 527 of which lighting is controlled by the microcomputer 514 notifies the user of the status of the MFP 10, such as job execution in progress and error occurrence.

Similar to the main controller unit 200, the operation unit 500 has at least two different power source systems: a first power source system and a second power source system. Devices which need to operate even in the sleep mode belong to the first power source system, and devices which do not need to operate in the sleep mode belong to the second power source system. The devices belonging to the first power source system include the microcomputer 514, the main power source LED 511, the power-saving button 512, a power-saving LED 513, a touch panel controller 516, and the key unit 515. The devices belonging to the second power source system include the LCD controller 523, the LCD touch panel unit 524, the buzzer 526, and the notification LED unit 527. Even when the MFP 10 is in the sleep mode, the power-saving button 512 and the power-saving LED 513 for turning on the power-saving button 512 are supplied with power so that the MFP 10 can recover from the sleep mode to the standby mode upon reception of a user operation on the power-saving button 512.

The human presence sensor unit 600, a device belonging to the first power source system, operates to detect a user of the MFP 10 in the sleep mode. The human presence sensor unit 600 includes an ultrasonic sensor 610. The microcomputer 514 determines whether a user of the MFP 10 is present by periodically reading and analyzing the detection result of the ultrasonic sensor 610. The ultrasonic sensor 610 according the present example embodiment is a sensor for inputting and outputting an ultrasonic wave with a single chip. The ultrasonic sensor 610 may include an oscillation chip for outputting an ultrasonic wave and a reception chip for receiving an ultrasonic wave as separate chips. The ultrasonic sensor (sonic wave output unit) 610 according the present example embodiment outputs an ultrasonic wave by vibrating a piezo-electric element disposed in the ultrasonic sensor 610 and outputs an electric signal (voltage value) corresponding to a vibration received by the piezo-electric element.

Although the present example embodiment will be described below centering on the use of the ultrasonic sensor 610, the sensor is not limited to an ultrasonic sensor. For example, a pyroelectric sensor or an infrared sensor may be used instead of an ultrasonic sensor.

The microcomputer 514 outputs an oscillation signal to the ultrasonic sensor 610 for a predetermined time period. Thus, the piezo-electric element of the ultrasonic sensor 610 vibrates to output an ultrasonic wave of 40 kHz in the non-audible region for a predetermined time period. Then, the microcomputer 514 determines whether a user of the MFP 10 is present based on the result of the detection of the ultrasonic wave received by the ultrasonic sensor 610. When the microcomputer 514 determines that a user of the MFP 10 is present, the microcomputer 514 outputs the interrupt signal C to the power control unit 211. When the interrupt signal C is input, the power control unit 211 controls the power source unit 100 to recover the power mode of the MFP 10 from the sleep mode to the standby mode. Although the present example embodiment has been described above centering on an example where power is supplied from the internal power generation unit 202 to the human presence sensor unit 600, the power source unit 100 may directly supply power to the human presence sensor unit 600.

Figure 3:
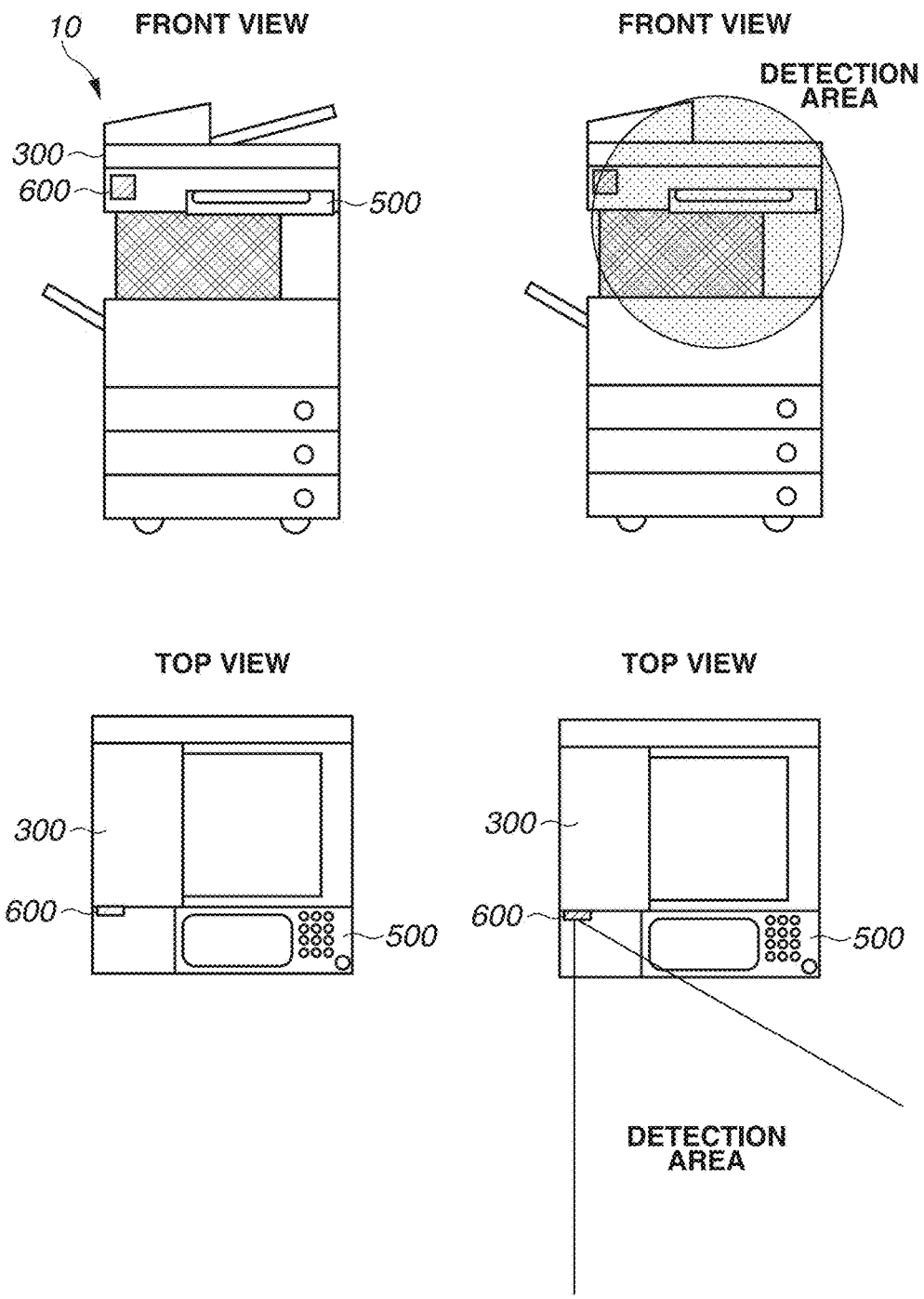
FIG. 3 illustrates a detection area of an ultrasonic sensor.

FIG. 3 illustrates the detection area of the ultrasonic sensor 610.

The ultrasonic sensor 610 according the present example embodiment outputs an ultrasonic wave and receives an ultrasonic wave (hereinafter suitably referred to as a reflected wave) reflected by an object such as a human body. The distance to the human body or object can be estimated based on the time period since an ultrasonic wave is output until a reflected wave is received. According to the present example embodiment, the microcomputer 514 calculates the distance to the human body or object based on the detection result of the ultrasonic sensor 610.

The ultrasonic sensor 610 is disposed so that the detection area of the ultrasonic sensor 610 is set directly in front of the MFP 10 or at a slightly downward position relative to the MFP 10. The detection area ranges from the MFP 10 to about 2 m. The setting position of the human presence sensor unit 600 is the front face of the scanner unit 300 which is the opposite side of the operation unit 500 when the MFP 10 is viewed from the front. The human presence sensor unit 600 is disposed being inclined toward the operation unit 500 to enable detecting a user standing in front of the operation unit 500.

Figure 4:
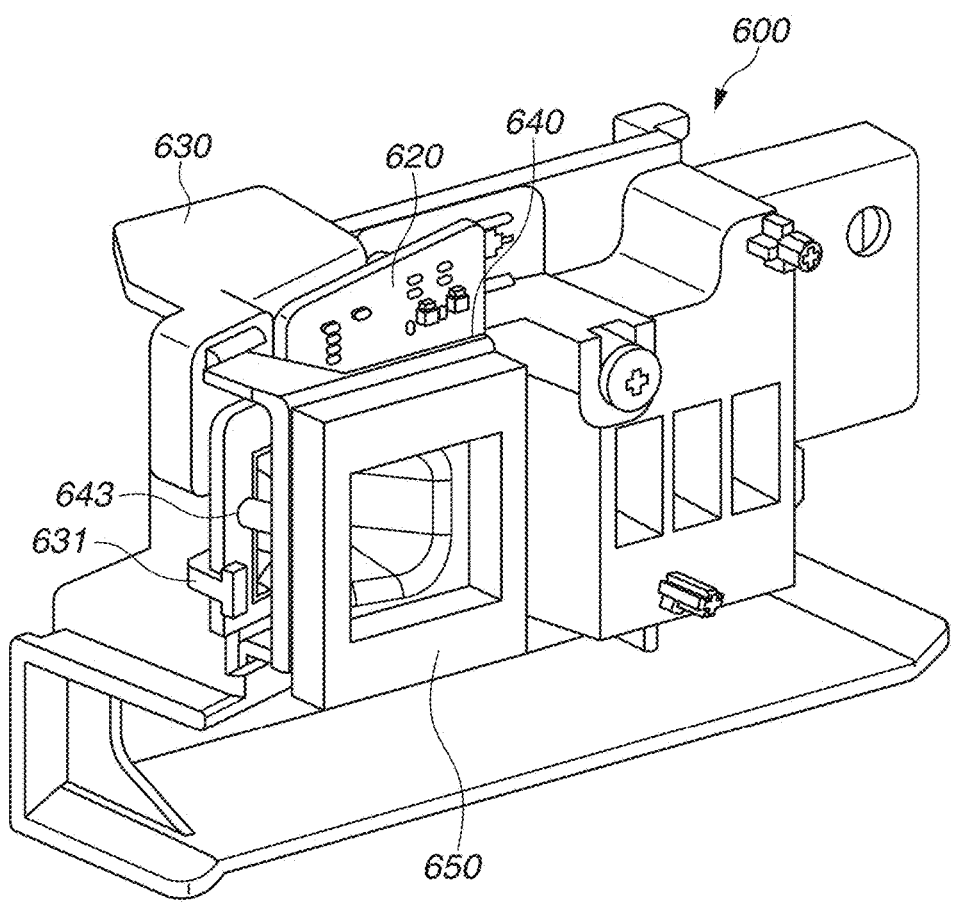
FIG. 4 is a perspective view illustrating a human presence sensor unit.

FIG. 4 is a perspective view illustrating the human presence sensor unit 600.

The human presence sensor unit 600 includes a substrate 620 with the ultrasonic sensor 610 mounted thereon, a base (fixing member) 630 for fixing the substrate 620, a horn 640 for restricting the output direction of the ultrasonic wave output by the ultrasonic sensor 610, and a buffer member (sponge) 650. The ultrasonic sensor 610, a surface mount device (SMD) type ultrasonic sensor, is mounted on the front surface of the substrate 620. The ultrasonic sensor 610 includes a piezo-electric element for outputting an ultrasonic wave according to the applied voltage and outputting an electric signal corresponding to a received ultrasonic wave.

The base 630 is a member for disposing the substrate 620 (with the ultrasonic sensor 610 mounted thereon) being inclined toward the operation unit 500.

Figure 5:
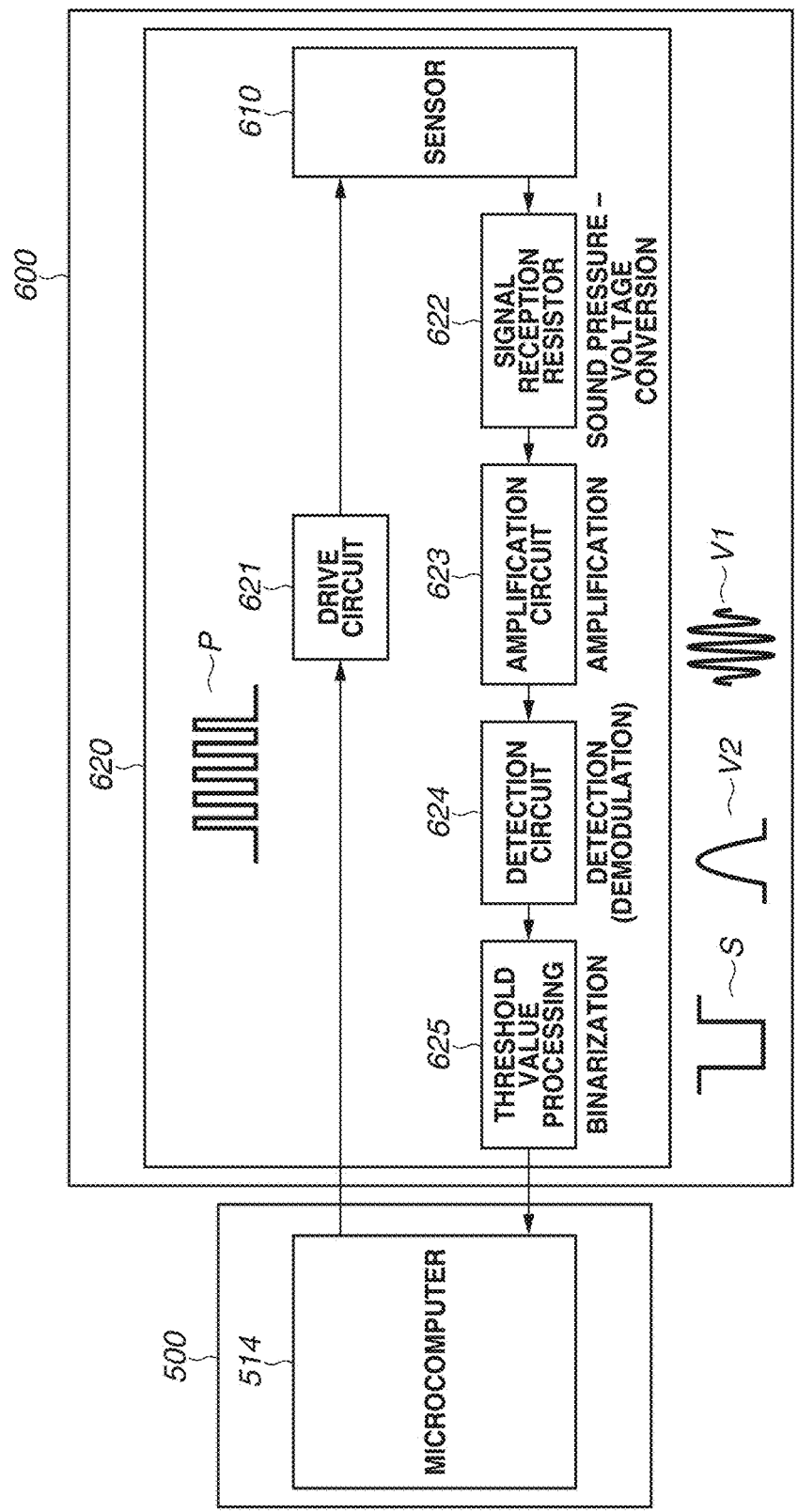
FIG. 5 is a block diagram illustrating a configuration of devices mounted on a substrate.

FIG. 5 is a block diagram illustrating a configuration of devices mounted on the substrate 620.

The substrate 620 is a 2-layer glass epoxy substrate. As illustrated in FIG. 5, the substrate 620 includes an ultrasonic sensor 610, a drive circuit 621, a signal reception resistor 622, an amplification circuit 623, a detection circuit 624, and a threshold value circuit 625. The drive circuit 621 vibrates the piezo-electric element of the ultrasonic sensor 610 upon reception of a drive pulse P output from the CPU 221. The signal reception resistor 622 converts the sonic pressure of the ultrasonic wave received by the ultrasonic sensor 610 into a voltage. The amplification circuit 623 amplifies the converted voltage. A voltage waveform V1 amplified by the amplification circuit 623 is demodulated by the detection circuit 624. A signal V2 output from the detection circuit 624 is compared with a voltage level set in the threshold value circuit 625. Then, an analog signal S is output from the threshold value circuit 625 to the microcomputer 514. The substrate 620 is disposed being inclined toward the operation unit 500 by about 15 degrees from the front of the MFP 10. The angle of the substrate 620 is not limited to the above-described 15 degrees, and adjusted based on the positional relation between the operation unit 500 and the human presence sensor unit 600. More specifically, the angle decreases with decreasing distance between the operation unit 500 and the human presence sensor unit 600 and increases with increasing distance.

The horn 640 is a member for controlling the directivity of the ultrasonic wave so that the ultrasonic wave output by the ultrasonic sensor 610 does not diffuse. If the horn 640 is absent, it is difficult to restrict the detection range. An opening 644 of the horn 640 on the side of a cover member 301 (FIG. 7) is an approximately 13×13 mm square. The opening 644 having the shape of a mortar decreases in size with decreasing distance to the ultrasonic sensor 610. The opening dimension of the opening 644 of the horn 640 is not limited to the above-described dimension.

Figure 6:
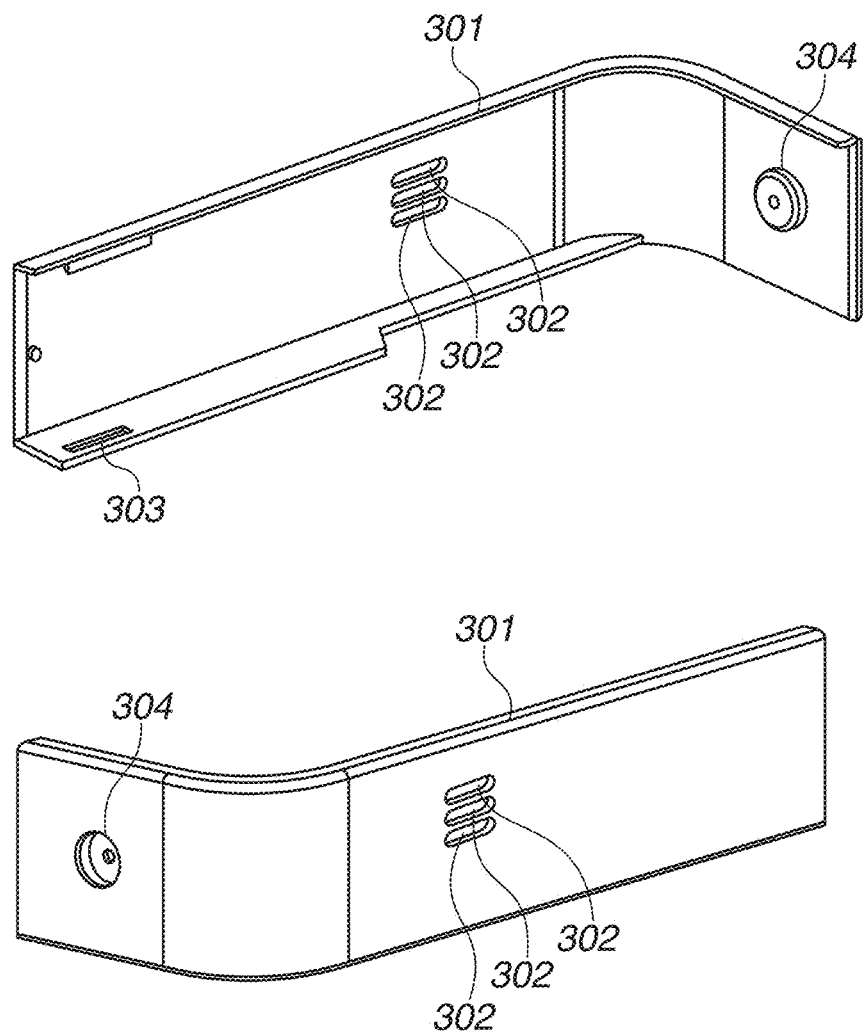
FIG. 6 illustrates details of a cover member.

The buffer member 650 is disposed between the horn 640 and the cover member 301 (FIG. 6, described below). The buffer member 650 fills the gap between the horn 640 and the cover member 301 to prevent leakage of the ultrasonic wave from the gap between the horn 640 and the cover member 301.

The cover member 301 will be described in detail below. FIG. 6 illustrates details of the cover member 301.

The cover member 301 is a part of the housing of the MFP 10. The cover member 301 is provided with a screw hole 304 and a hooking portion 303 for attaching the human presence sensor unit 600 to the MFP 10. According to the present example embodiment, the cover member 301 is further provided with a plurality of slits 302 (three slits 302 in the present example embodiment) for outputting to the outside the ultrasonic wave output by the ultrasonic sensor 610. The slits 302 are openings continuously formed along the horizontal direction. The three slits 302 are formed in parallel at intervals of approximately 1.6 mm between slits. Although the dimension of each slit 302 is approximately 3.4×16.5 mm, the dimension of each slit 302 is not limited thereto.

The horizontal opening dimension of each slit 302 is approximately 16.5 mm, and is larger than the horizontal opening dimension of the horn 640, 13 mm. As described above, the horizontal opening dimension (approximately 16.5 mm) of each slit 302 is made larger than the opening dimension (approximately 13 mm) of the horn 640 to prevent the cover member 301 from interrupting the ultrasonic wave output via the horn 640. Forming a plurality of the slits 302 on the cover member 301 enables preventing intrusion of a user's finger while ensuring the area of the opening for outputting the ultrasonic wave. Further, according to the present example embodiment, a plurality of slits 302 each has a horizontally extending shape, thereby preventing the generation of dead angles which disturb detection of a person moving on a horizontal plane in the detection range of the ultrasonic sensor 610. As a result, the reflected wave returns with a stable intensity regardless of the position of the user in the detection range of the ultrasonic sensor 610.

Figure 17:
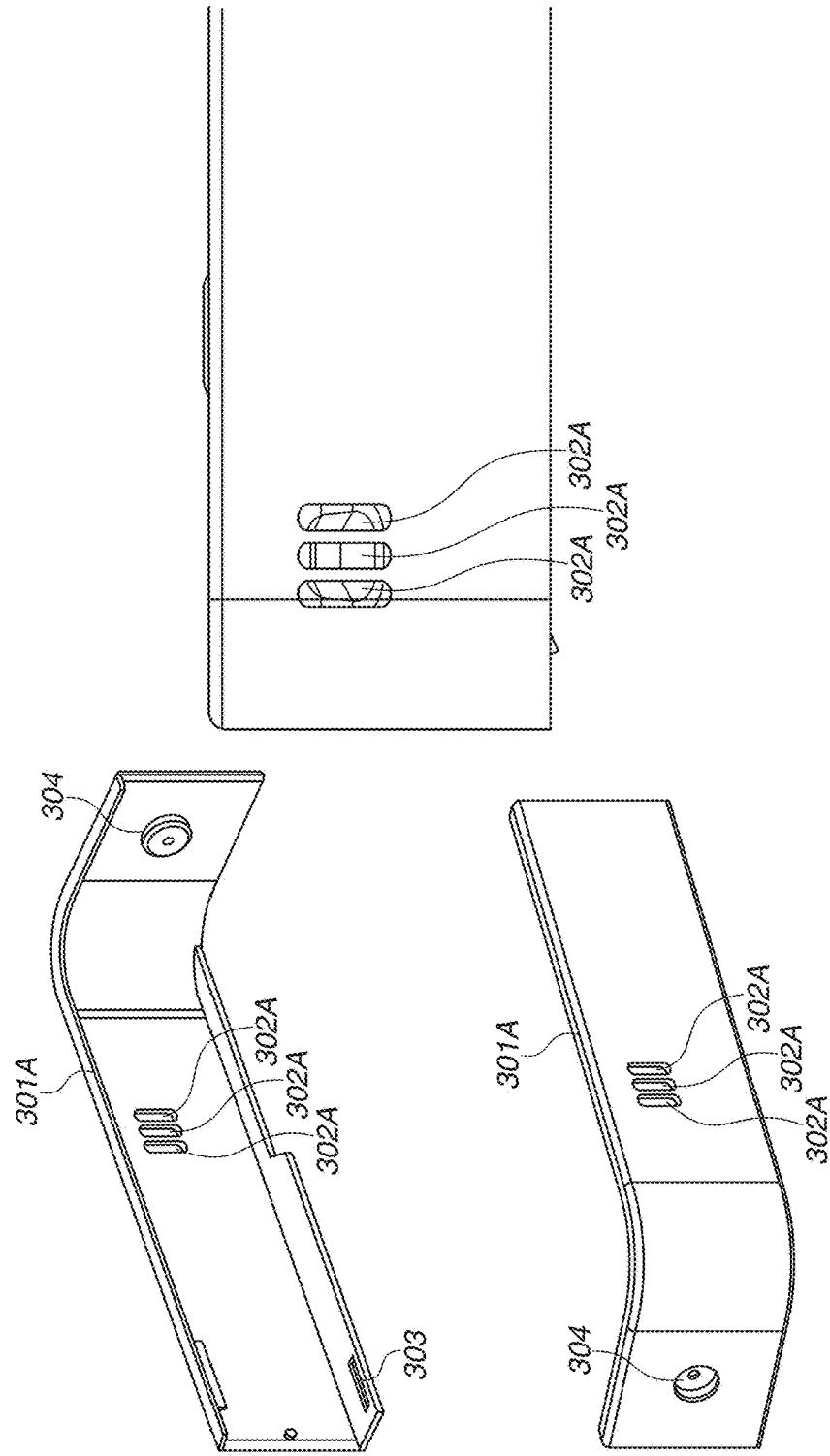
FIG. 17 illustrates details of a cover member according to a comparative example.

A comparative example in which a plurality of slits each having a vertically extending shape is formed will be described below for comparison with the slits 302 according the present example embodiment. FIG. 17 illustrates a cover member 301A with a plurality of slits each having a vertically extending shape is formed thereon. Slits 302A of the cover member 301A according to the comparative example are the same as the above-described slits 302 according to the example embodiment except that the slits 302A each having a vertically extending shape are horizontally juxtaposed, and redundant descriptions thereof will be omitted.

FIGS. 18A, 18B, and 18C illustrate states where dead angles exist when the cover member 301A according to the comparative example is used. As described in the comparative example, when the slits 302A each having a vertically extending shape are horizontally juxtaposed, as illustrated in FIG. 18A, a user standing at a position distant from the MFP 10 may enter a dead angle of the ultrasonic sensor 610. When the user enters a dead angle of the ultrasonic sensor 610, the amplitude Va of the reflected wave will become very small. When the slits 302 each having a horizontally extending shape are vertically juxtaposed as in the example embodiment, dead angles exist (on the user's abdomen and chest) in the vertical direction. However, there arises no problem since the ultrasonic sensor 610 can detect the ultrasonic wave reflected by portions other than the abdomen and chest.

When a user crosses the front of the MFP 10, as illustrated in FIGS. 18B and 18C, only the detection amplitude V largely fluctuates although the detection distance D hardly change when the user enters a dead angle of the ultrasonic sensor 610 and when the user exits the dead angle. Accordingly, when the slits 302A each having a vertically extending shape are formed and horizontally juxtaposed on the cover member 301A as in the comparative example, it is necessary to correct the amplitude V depending on whether the user is present or absent in a dead angle.

FIG. 7 illustrates the human presence sensor unit 600 before and after the horn 640 is attached thereto.

The human presence sensor unit 600 is fixed to a frame plate (fixing member) 700 provided in the scanner unit 300. The substrate 620 is fixed to the base 630 by a screw 626.

The horn 640 is disposed on the side of the substrate 620 on which the ultrasonic sensor 610 mounted. The horn 640 is fixed to the base 630. The buffer member 650 is attached to the end of the horn 640 on the side of the cover member 301. The buffer member 650 is disposed between the horn 640 and the cover member 301 to fill the gap between the horn 640 and the cover member 301. This enables preventing leakage of the ultrasonic wave output by the ultrasonic sensor 610 from the gap between the horn 640 and the cover member 301. The buffer member 650 formed of a sponge enables preventing the vibration of the horn 640 from propagating to the cover member 301.

FIGS. 8A, 8B, and 8C are sectional views illustrating the human presence sensor unit 600. FIG. 8A is a front view illustrating a portion of the scanner unit 300 where the human presence sensor unit 600 is disposed. FIG. 8B is a top view illustrating a portion of the scanner unit 300 where the human presence sensor unit 600 is disposed. FIG. 8C is a sectional view taken along the A-A line of FIG. 8B.

When the human presence sensor unit 600 is disposed at a position where the user can touch the human presence sensor unit 600, a user's finger may come into contact with the ultrasonic sensor 610 or the substrate 620, possibly causing damage to the ultrasonic sensor 610 or the substrate 620. Thus, as illustrated in FIG. 8A, the human presence sensor unit 600 is covered by the cover member 301 of the scanner unit 300. The cover member 301 is provided with a plurality of the slits 302 for outputting the ultrasonic wave output by the ultrasonic sensor 610 to the outside and receiving a reflected wave of the ultrasonic wave reflected outside. Each slit 302 has the shape of a horizontally extending hole. According to the present example embodiment, three slits are vertically disposed. The horizontal length (lateral width) of each slit 302 is larger than the horizontal opening dimension of the horn 640.

Figure 9:
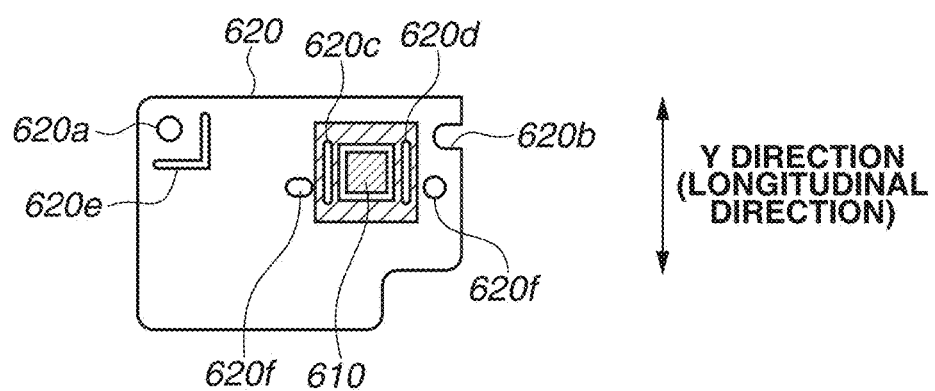
FIG. 9 is a plan view illustrating the substrate with the ultrasonic sensor mounted thereon.

FIG. 9 is a plan view illustrating the substrate 620 with the ultrasonic sensor 610 mounted thereon.

The ultrasonic sensor 610 is mounted on the substrate 620. Although the substrate 620 mounts the above-described drive circuit 621, the signal reception resistor 622, the amplification circuit 623, the detection circuit 624, the threshold value circuit 625, etc., these elements are omitted in FIG. 9. The substrate 620 is provided with a screw hole 620a for passing the screw 626 for fixing the substrate 620 to the base 630. More specifically, the portion on the substrate 620 where the screw hole 620a is formed is the contact portion between the base 630 and the substrate 620. The screw 626 is fixed to the base 630 via the screw hole 620a. The end of the substrate 620 on the opposite side of the screw hole 620a is provided with a notch portion 620b at which a claw portion 631 formed on the base 630 is to be hooked.

Slits 620c and 620d are formed around the ultrasonic sensor 610 on the substrate 620. The slit 620c is formed at a position between the ultrasonic sensor 610 and a screw hole 620a on the substrate 620. The slit 620d is formed at a position between the ultrasonic sensor 610 and the notch portion 620b on the substrate 620. The length in the longitudinal direction (Y direction in FIG. 9) of the slit 620c is longer than the length of the ultrasonic sensor 610 in the above-described longitudinal direction. The length of the slit 620d in the longitudinal direction is also longer than the length of the ultrasonic sensor 610 in the above-described longitudinal direction.

An L-shaped slit 620e is formed between the ultrasonic sensor 610 and the screw hole 620a on the substrate 620. The slit 620e is formed to surround the screw hole 620a. Similar to the slit 620c, the slit 620e is formed at a position between the ultrasonic sensor 610 and the screw hole 620a on the substrate 620.

Forming the slits 620c, 620d, and 620e on the substrate 620 in this way enables preventing the vibration of the ultrasonic sensor 610 from propagating from the screw 626 or the claw portion 631 to other members (the frame plate 700 and the base 630). When the substrate 620 and the frame plate 700 need to be electrically connected with each other, the metal screw 626 is employed. However, when the substrate 620 and the frame plate 700 do not need to be electrically connected with each other, the plastic screw 626 may be employed. When the plastic screw 626 is employed, the vibration of the ultrasonic sensor 610 can be prevented from propagating to other members via the screw 626.

The substrate 620 according the present example embodiment is provided with boss holes 620f for passing bosses 643 formed on the horn 640. When the bosses 643 of the horn 640 enter the boss holes 620f, the position of the horn 640 relative to the ultrasonic sensor 610 can be determined with high precision. A buffer member 651 contacts the shaded region illustrated in FIG. 9. The buffer member 651 contacts a region in which the slits 620c and 620d are formed on the substrate 620.

Figure 10A:
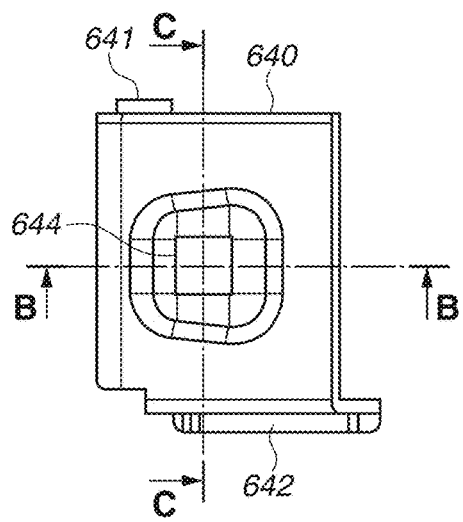
FIGS. 10A, 10B, 10C, and 10D illustrate a detailed structure of the horn.
Figure 10B:
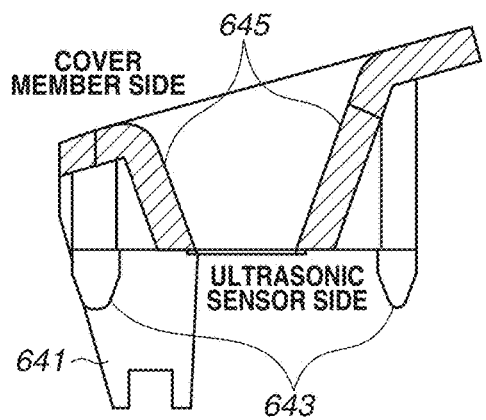
Figure 10C:
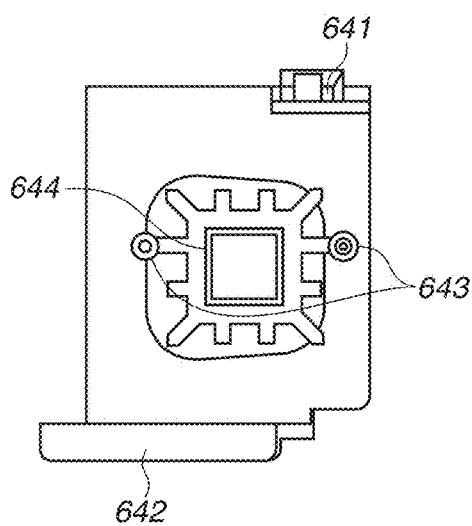
Figure 10D:
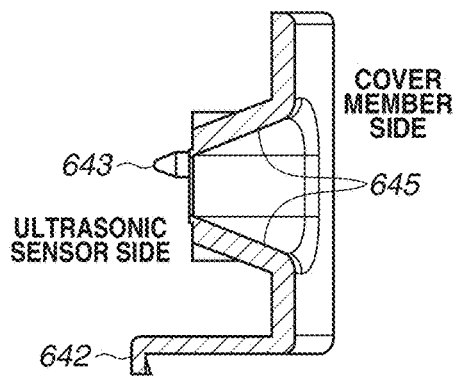

FIGS. 10A, 10B, 10C, and 10D illustrate a detailed structure of the horn 460. FIG. 10A is a front view illustrating the horn 460, FIG. 10B is a sectional view taken along the B-B line of FIG. 10A, FIG. 10C is a rear view illustrating the horn 460, and FIG. 10D is a sectional view taken along the C-C line of FIG. 10A.

The horn 640 is a member for controlling the directivity of the ultrasonic wave transmitted from the ultrasonic sensor 610 mounted on the substrate 620. The horn 640 has such a mortar shape that the opening decreases in size with decreasing distance to the ultrasonic sensor 610 as illustrated in FIGS. 10A and 10D. Although an inner surface 645 of the horn 640 according the present example embodiment is formed of a plurality of flat surfaces, the inner surface 645 may be formed of curved surfaces. The horn 640 is provided with hooking portions 641 and 642 for fixing the horn 640 to the base 630. The horn 640 is not fixed to the substrate 620 but fixed to the base 630. Fixing the horn 640 to the base 630 enables preventing the vibration of the ultrasonic sensor 610 from propagating to the horn 640. The horn 640 may be fixed to the substrate 620 as long as the vibration to the horn 640 can sufficiently be restricted by the slits 620c, 620d, and 620e formed on the substrate 620.

As illustrated in FIGS. 10B and 10C, the two bosses 643 for determining the position of the horn 640 relative to the ultrasonic sensor 610 are formed on the horn 640. To provide the ultrasonic wave output by the ultrasonic sensor 610 with directivity, it is better to dispose the horn 640 close to the ultrasonic sensor 610. However, if the horn 640 is fixed to the substrate 620 with the ultrasonic sensor 610 mounted thereon, the vibration of the ultrasonic sensor 610 will propagate to the horn 640, and will be disturbed by the horn 640.

Figure 11A:
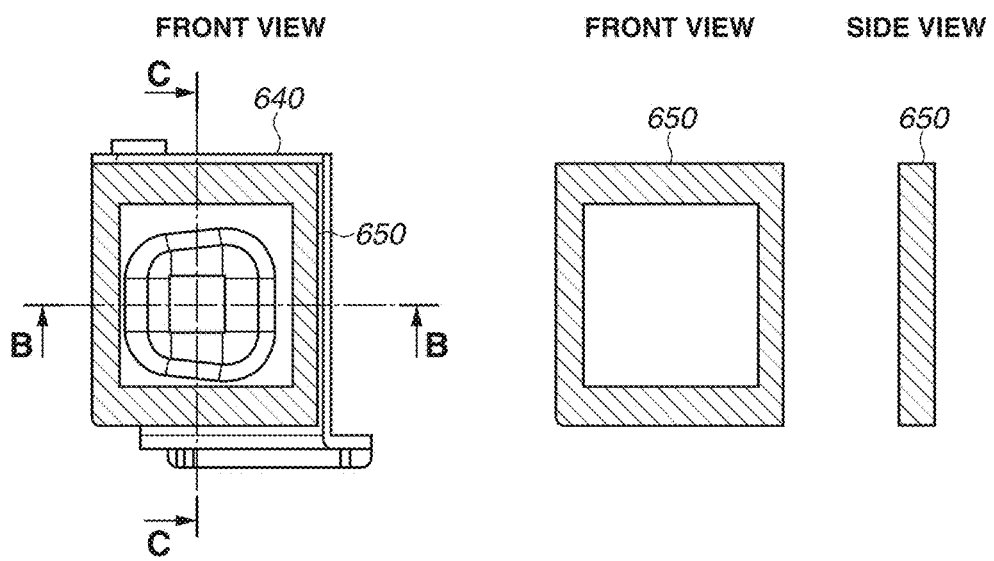
FIGS. 11A and 11B each illustrate a buffer member attached to the horn.
Figure 11B:
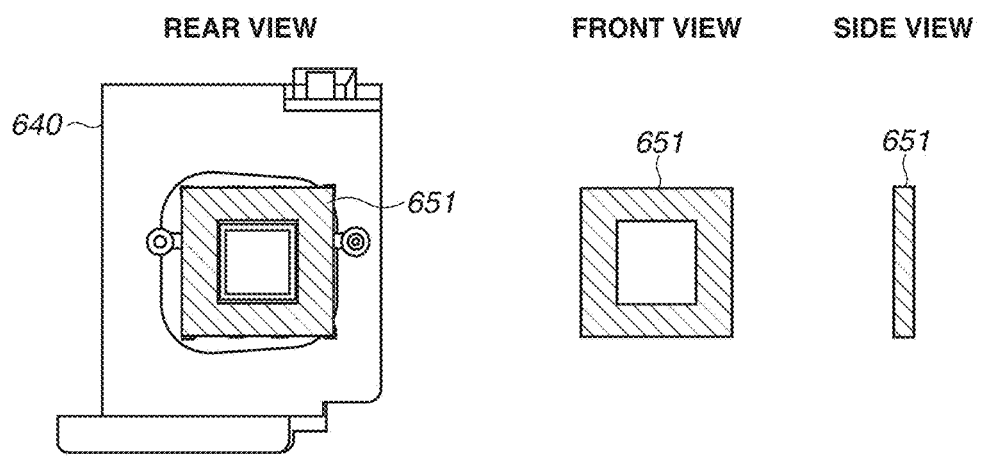

FIGS. 11A and 11B illustrate the buffer members 650 and 651 attached to the horn 640, respectively. FIG. 11A illustrates the buffer member 650 attached on the side of the cover member of the horn 640. FIG. 11B illustrates the buffer member 651 attached on the side of the substrate of the horn 640.

As illustrated in FIG. 11A, the buffer member 650 is disposed between the horn 640 and the cover member 301. The buffer member 650 is a sponge. The buffer member 650 has an opening larger than the opening of the horn 640 on the side of the cover member 301.

As illustrated in FIG. 11B, the buffer member 651 is disposed between the horn and the substrate 620. Similar to the buffer member 650, the buffer member 651 is also a sponge. The buffer member 651 has an opening larger than the opening of the horn 640 on the side of the substrate 620.

It is desirable that the buffer members 650 and 651 are made of materials having high sonic absorption and sonic insulating properties. For example, materials having excellent sonic absorption properties, such as glass wool, rock wool, flexible urethane foam, and other porous materials having a coarse surface and containing a number of bubble shapes, are desirably employed as the buffer members 650 and 651. Materials having excellent sonic insulating properties, such as sponge, rubber, and other flexible materials having a small compression stress and suitably fitting the unevenness of the application target object, can be employed as the buffer members 650 and 651.

Materials having high vibration resistance and damping properties are more desirable as the buffer members 650 and 651. Materials having excellent vibration resistance and damping properties, such as rubber, sponge, and other elastic damping materials, can be employed as the buffer members 650 and 651.

According to the present example embodiment, EPT-sealer from NITTO DENKO CORPORATION or CALM-FLEX from INOAC CORPORATION is employed as the buffer members 650 and 651.

Figure 12A:
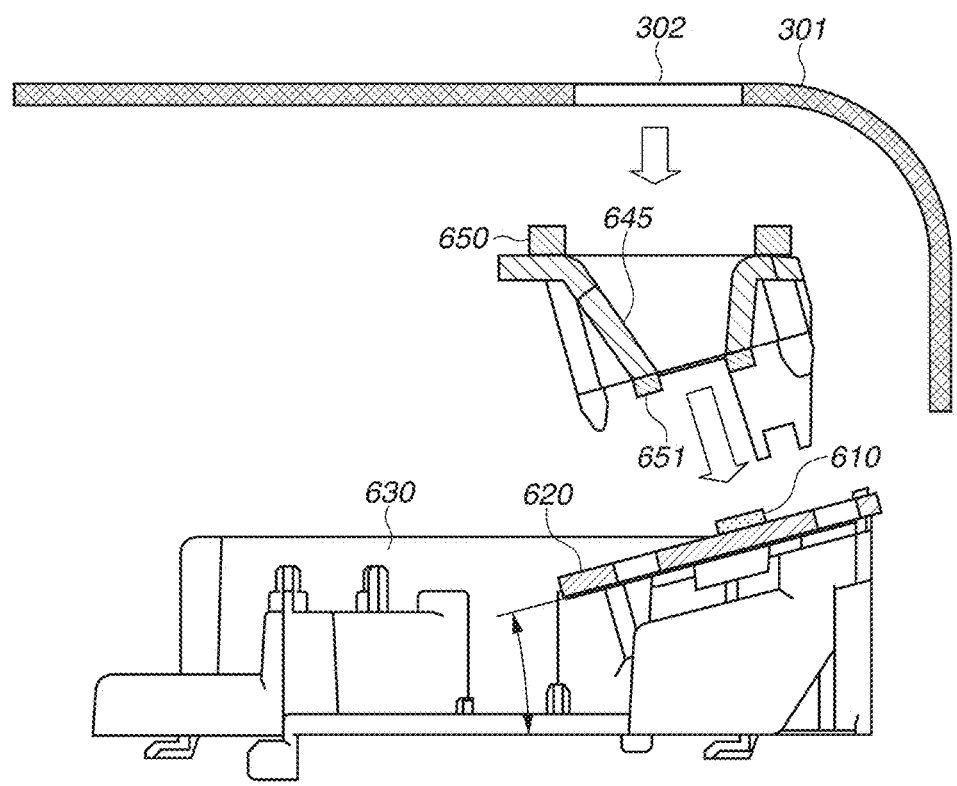
FIGS. 12A and 12B are sectional views illustrating the human presence sensor unit.
Figure 12B:
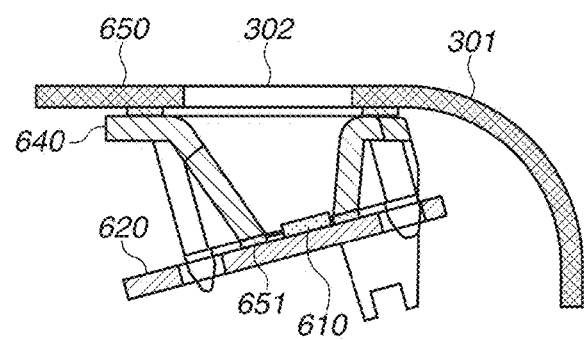

FIGS. 12A and 12B are sectional views illustrating the human presence sensor unit 600. FIG. 12A is a fragmentary sectional view illustrating the human presence sensor unit 600, and FIG. 12B is a sectional view illustrating the human presence sensor unit 600.

As illustrated in FIG. 12A, the buffer member 651 is not compressed before the horn 640 is fixed to the base 630. As illustrated in FIG. 12A, the buffer member 650 is not compressed before the cover member 301 is attached to the front of the horn 640.

When the horn 640 is fixed to the base 630, the buffer member 651 is compressed to fill the gap between the substrate 620 and the horn 640. This enables preventing leakage of the ultrasonic wave output by the ultrasonic sensor 610 from the gap between the substrate 620 and the horn 640. Further, since the substrate 620 contacts the horn 640 via the buffer member 651, the vibration of the ultrasonic sensor 610 can be prevented from propagating from the substrate 620 to the horn 640.

Further, when the cover member 301 is attached, the buffer member 650 is compressed to fill the gap between the cover member 301 and the horn 640. This enables preventing leakage of the ultrasonic wave output by the ultrasonic sensor 610 from the gap between the cover member 301 and the horn 640. Further, since the horn 640 contacts the cover member 301 via the buffer member 650, the vibration of the ultrasonic sensor 610 can be prevented from propagating from the horn 640 to the cover member 301.

FIGS. 13T1, 13T2, 13T3, and 13T4 illustrate a case where a user straightly approaches the front of the MFP 10. FIGS. 13T1, 13T2, 13T3, and 13T4 illustrate the positional relation between the MFP 10 and a user when viewed from a lateral position (top), the positional relation between the MFP 10 and the user when viewed from above (middle), and the detection result of the ultrasonic sensor (bottom). FIGS. 13T1, 13T2, 13T3, and 13T4 illustrate the statuses at times t1, t2, t3, and t4, respectively, from left to right. This also applies to FIGS. 14T1, 14T2, 14T3, and 14T4, and FIGS. 15T1, 15T2, 15T3, and 15T4 (described below).

As illustrated in FIGS. 13AT1 to 13T4 (bottom), the waveform of the detection result of the ultrasonic sensor 610 contains a waveform accompanying the oscillation of the ultrasonic wave and the waveform by a reflected wave. According the present example embodiment, the human presence sensor unit 600 oscillates the ultrasonic sensor 610 to output an ultrasonic wave for a predetermined time period. Accordingly, in the early stage of the detection result of the ultrasonic sensor 610, an influence by the oscillation for outputting an ultrasonic wave occurs. Then, the ultrasonic sensor 610 receives a reflected wave of the ultrasonic wave reflected by a human body or object. The ultrasonic sensor 610 outputs the sonic pressure intensity of the reflected wave as a voltage value (referred to as a detection amplitude V). If the output unit for outputting an ultrasonic wave and the receiving unit for receiving an ultrasonic wave are separated, the waveform accompanying the oscillation does not appear. Since the ultrasonic wave output from the output unit is directly received by the receiving unit, waveforms similar to the ones illustrated in FIGS. 13T1 to 13T4 result.

FIG. 13T1 illustrates a status where a user has entered a detectable position of the ultrasonic sensor 610. As a detection result of the ultrasonic sensor 610, a detection amplitude V1 larger than a predetermined threshold amplitude Vth2 has occurred when a time period D1 has elapsed since the ultrasonic sensor 610 oscillated an ultrasonic wave. The time period D1 refers to a time period since the time when the ultrasonic wave is output till the time when the ultrasonic wave reflected by a user's body returns to the ultrasonic sensor 610. Thus, the time period D1 corresponds to the distance between the MFP 10 and the user. In subsequent descriptions, as required, the time period D1 (since the time when a direct wave is output till the time when a reflected wave is detected) will be handled as the distance D1. According to the present example embodiment, the microcomputer 514 determines that a person is present in a detection area A1 upon detection of the detection amplitude V larger than the threshold amplitude Vth2 at a position further than a predetermined distance Dth (hereinafter referred to as a threshold distance Dth). The microcomputer 514 also determines that a person is present in a detection area A2 upon detection of the detection amplitude V larger than a threshold amplitude Vth1 (>Vth2) at a position closer than the threshold distance Dth. When a user is present at a position distant from the ultrasonic sensor 610, the reflected wave from the distant position diffuses and part of the reflected wave cannot be received, resulting in a decrease in the detection amplitude V. Referring to FIG. 13T1, the detection amplitude V exceeding the threshold amplitude Vth1 has not occurred at a position closer than the threshold distance Dth, and thus the MFP 10 maintains the sleep mode.

FIG. 13T2 illustrates a state where the user has moved toward the detection area A2 and has not yet entered the detection area 2.

As a detection result of the ultrasonic sensor 610, a detection amplitude V2 larger than the threshold amplitude Vth2 is output at a distance D2 closer than a distance D1 and further than the threshold distance Dth. The detection amplitude V2 is larger than the detection amplitude V1. Referring to FIG. 13T2, the detection amplitude V exceeding the threshold amplitude Vth1 has not occurred at a position closer than the threshold distance Dth, and thus the MFP 10 maintains the sleep mode.

FIG. 13T3 illustrates a state where the user has entered the detection area A2. As a detection result of the ultrasonic sensor 610, a detection amplitude V3 larger than the threshold amplitude Vth1 is output at a distance D3 closer than the threshold distance Dth. Referring to FIG. 13T3, the detection amplitude V exceeding the threshold amplitude Vth1 has occurred at a position closer than the threshold distance Dth but has not continuously occurred for a predetermined time period at a position closer than the threshold distance Dth, and thus the MFP 10 maintains the sleep mode.

FIG. 13T4 illustrates a state where the user is staying in the detection area A2. As a detection result of the ultrasonic sensor 610, a detection amplitude V4 larger than the threshold amplitude Vth1 is output at a distance D4 closer than the threshold distance Dth. If the detection amplitude V exceeding the threshold amplitude Vth1 continuously occurs for a predetermined time period at a position closer than the threshold distance Dth, the MFP 10 cancels the sleep mode and shifts to the standby mode. The predetermined time period is, for example, 300 ms.

FIGS. 14T1, 14T2, 14T3, and 14T4 illustrate a case where a user approaches the MFP 10 from a side of the MFP 10.

FIG. 14T1 illustrates a state where the user has entered a detectable position of the ultrasonic sensor 610. As a detection result of the ultrasonic sensor 610, a detection amplitude V5 larger than the threshold amplitude Vth1 is output at a distance D5 closer than the threshold distance Dth. At this timing, the detection amplitude V exceeding the threshold amplitude Vth1 has not continuously occurred for a predetermined time period (for example, 300 ms) at a position closer than the threshold distance Dth, and thus the MFP 10 maintains the sleep mode.

FIG. 14T2 illustrates a state where the user has moved in the detection area A2. As a detection result of the ultrasonic sensor 610, a detection amplitude V6 larger than the threshold amplitude Vth1 is output at a distance D6 closer than the threshold distance Dth. Also at this timing, the detection amplitude V exceeding the threshold amplitude Vth1 has not continuously occurred for a predetermined time period (for example, 300 ms) at a position closer than the threshold distance Dth, and thus the MFP 10 maintains the sleep mode.

FIG. 14T3 illustrates a state where the user has arrived at the front of the MFP 10. As a detection result of the ultrasonic sensor 610, a detection amplitude V7 larger than the threshold amplitude Vth1 is output at a distance D7 closer than the threshold distance Dth. Also at this timing, the detection amplitude V exceeding the threshold amplitude Vth1 has not continuously occurred for a predetermined time period (for example, 300 ms) at a position closer than the threshold distance Dth, and thus the MFP 10 maintains the sleep mode.

FIG. 14T4 illustrates a state where the user is staying in front of the MFP 10. As a detection result of the ultrasonic sensor 610, a detection amplitude V8 larger than the threshold amplitude Vth1 is output at a distance D8 closer than the threshold distance Dth. At this timing, the detection amplitude V exceeding the threshold amplitude Vth1 has continuously occurred for a predetermined time period (for example, 300 ms) at a position closer than the threshold distance Dth, and thus the MFP 10 cancels the sleep mode and recovers to the standby mode.

FIGS. 15T1, 15T2, 15T3, and 15T4 illustrate a case where a passer-by passes through the front of the MFP 10.

FIG. 15T1 illustrates a state where a user has entered the detectable range of the ultrasonic sensor 610. As a detection result of the ultrasonic sensor 610, a detection amplitude V9 larger than the threshold amplitude Vth1 is output at a distance D9 closer than the threshold distance Dth. At this timing, the detection amplitude V exceeding the threshold amplitude Vth1 has not continuously occurred for a predetermined time period (for example, 300 ms) at a position closer than the threshold distance Dth, and thus the MFP 10 maintains the sleep mode.

FIG. 15T2 illustrates a state where the passer-by has moved in the detection area A2. As a detection result of the ultrasonic sensor 610, a detection amplitude V10 larger than the threshold amplitude Vth1 is output at a distance D10 closer than the threshold distance Dth. Also at this timing, the detection amplitude V exceeding the threshold amplitude Vth1 has not continuously occurred for a predetermined time period (for example, 300 ms) at a position closer than the threshold distance Dth, and thus the MFP 10 maintains the sleep mode.

FIG. 15T3 illustrates a state where the passer-by has moved out of the detection area A2. As a detection result of the ultrasonic sensor 610, a detection amplitude V11 larger than the threshold amplitude Vth1 is output at a distance D11 further than the threshold distance Dth. The detection amplitude V11 larger than the threshold amplitude Vth1 has not occurred at a position closer than the threshold distance Dth, and thus the MFP 10 maintains the sleep mode.

FIG. 15T4 illustrates a state where the user has moved out of the detection area A1. As a detection result of the ultrasonic sensor 610, a detection amplitude V12 smaller than the threshold amplitude Vth1 is output at a distance D12 further than the threshold distance Dth. The detection amplitude V11 larger than the threshold amplitude Vth1 has not occurred at a position closer than the threshold distance Dth, and thus the MFP 10 maintains the sleep mode. When the passer-by begins to move away from the position (in front of the operation unit 500) where the passer-by uses the MFP 10 as illustrated in FIG. 15T4, the detection distance D gradually increases and the detection amplitude V gradually decreases.

FIG. 16 is a flowchart illustrating a recovery algorithm based on the detection result of the ultrasonic sensor 610. The microcomputer 514 of the MFP 10 executes each step of the flowchart illustrated in FIG. 16 according to a program.

In step S1001, the microcomputer 514 acquires the detection result of the ultrasonic sensor 610 at intervals of a predetermined time period (for example, 100 ms). In step S1002, based on the detection result acquired from the ultrasonic sensor 610, the microcomputer 514 calculates the distance D at which the detection amplitude V larger than the detection amplitude Vth1 occurred. In step S1003, the microcomputer 514 determines whether the calculated distance D is equal to or larger than the predetermined threshold distance Dth.

When the microcomputer 514 determines that the calculated distance D is equal to or larger than the predetermined threshold distance Dth (YES in step S1003), the processing proceeds to step S1004. In step S1004, the microcomputer 514 increments a count C. Then, in step S1005, the microcomputer 514 determines whether the count C is equal to or larger than a predetermined value Ct (for example, Ct=4). When the microcomputer 514 determines that the count C is equal to or larger than the predetermined value Ct (YES in step S1005), the processing proceeds to step S1006. In step S1006, the microcomputer 514 outputs the interrupt signal C to the power control unit 211. When the power control unit 211 receives the interrupt signal C, the power control unit 211 recovers the MFP 10 from the sleep mode to the standby mode. Then, in step S1007, the microcomputer 514 clears the count C.

On the other hand, when the microcomputer 514 determines that the calculated distance D is smaller than the threshold distance Dth (NO in step S1003), the processing proceeds to step S1008. In step S1008, the microcomputer 514 clears the count C. Further, when the microcomputer 514 determines that the count C is smaller than the predetermined value Ct (NO in step S1005), the processing returns to step S1001.

Other Example Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-150106, filed Jul. 29, 2016, which is hereby incorporated by reference herein in its entirety.

What is claimed is:

1. An information processing apparatus comprising:
a sonic wave output unit that outputs a sonic wave;
a cover member that forms an outer surface of the information processing apparatus;
a horn that is disposed between the sonic wave output unit and the cover member and includes a first opening into which the sonic wave output unit is stored, a second opening having an opening area larger than an opening area of the first opening, and a flange formed outside the first and second openings; and
a buffer member that is disposed between the flange and the cover member, includes a third opening having an opening area larger than the opening area of the second opening, and is provided to surround the second opening,
wherein one or more slits having a width in a horizontal direction longer than the first opening and shorter than the third opening are formed in a region on the cover member corresponding to an the second opening of the horn.

2. The information processing apparatus according to claim 1, wherein a plurality of slits is formed in the region, and each of the slits has a width in the horizontal direction longer than the first opening and shorter than the third opening.

3. The information processing apparatus according to claim 2, wherein the plurality of slits is disposed in parallel.

4. The information processing apparatus according to claim 1, wherein the cover member is a part of a housing of the information processing apparatus.

5. The information processing apparatus according to claim 1, wherein the sonic wave output unit outputs a sonic wave, receives a sonic wave, and outputs a voltage according to sonic pressure of the received sonic wave.

6. The information processing apparatus according to claim 1, further comprising a control unit that changes power modes of the information processing apparatus based on the received sonic wave.

7. The information processing apparatus according to claim 1, wherein the sonic wave output unit is an ultrasonic sensor.

8. The information processing apparatus according to claim 1, further comprising a printing unit configured to print an image on paper.

* * * * *